April 9, 1968    D. S. CLARKE ETAL    3,376,792
CONSTANT FLOW HYDRAULIC CONTROLS
Filed Jan. 3, 1966    2 Sheets-Sheet 1

Inventors
Dudley S. Clarke and
Lawrence Richards
By Darbo, Robertson
& Vandenburgh    Att'ys.

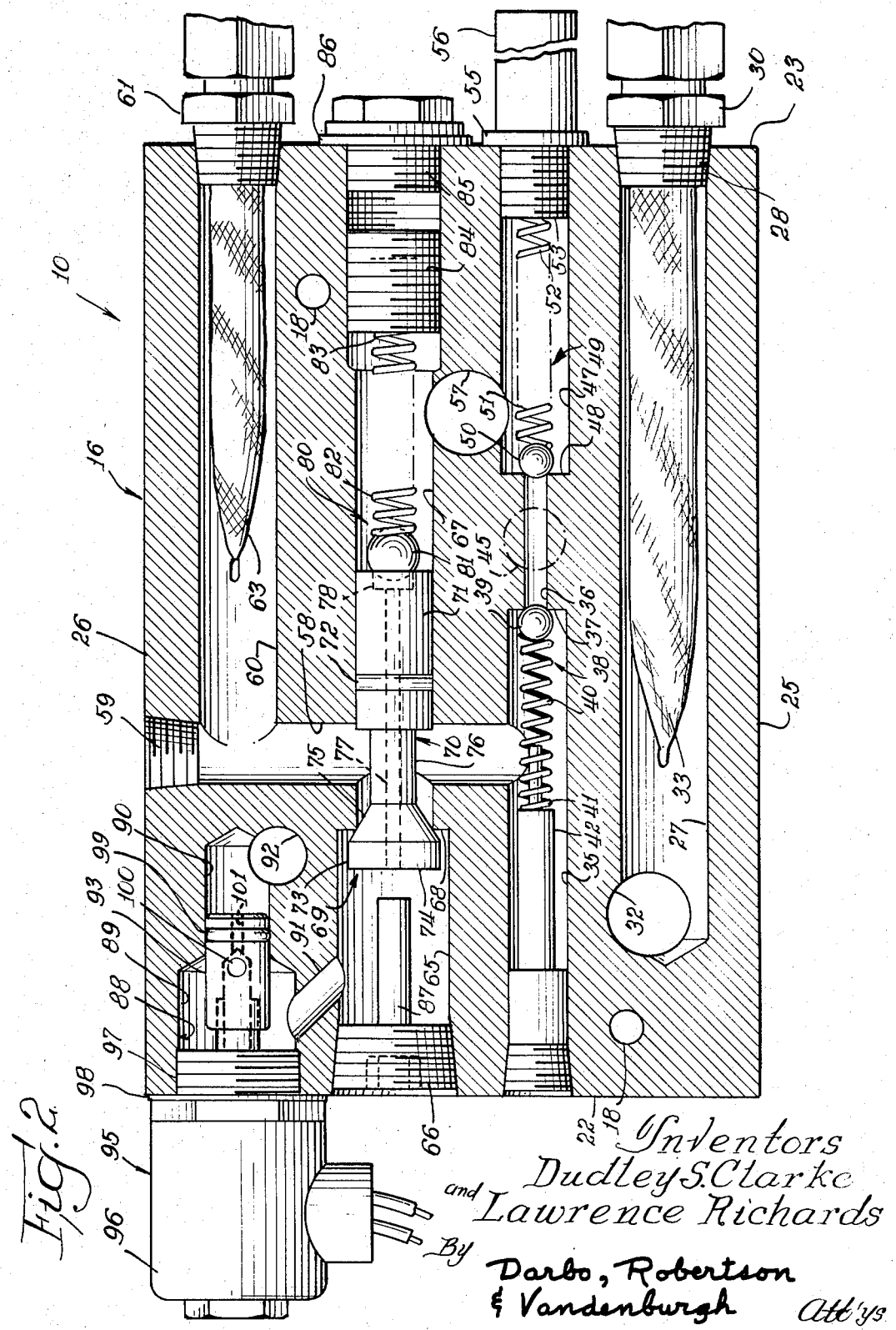

United States Patent Office 3,376,792
Patented Apr. 9, 1968

3,376,792
CONSTANT FLOW HYDRAULIC CONTROLS
Dudley S. Clarke, Chicago, and Lawrence Richards, Elk Grove, Ill., assignors to Autoquip Corporation, Chicago, Ill., a corporation of Illinois
Filed Jan. 3, 1966, Ser. No. 518,216
2 Claims. (Cl. 91—443)

ABSTRACT OF THE DISCLOSURE

A control block assembly is provided for controlling the fluid flow in a hydraulic system and is adapted to the affixed side of a hydraulic reservoir with openings in the block in communication with openings in the reservoir so that the fluid connections therewith are provided for permitting the assembly to be easily removed for replacement or servicing. The block is rectangular and extending inwardly from the side edges, and generally parallel to each other or four openings. The lower opening provides intake communication with the reservoir and an external connection to the pump intake and has a strainer in the opening. The opening thereabove has two enlarged end portions connected by a smaller central portion. The connection from the high pressure side of the pump communicates with the smaller central portion. At each end of the smaller central portion are balls urged against the ends, as seats, by springs in the large portions. One of these forms a high pressure relief valve and that enlarged portion communicates with the reservoir through a drain opening. The other serves as a check valve and communicates with a high pressure communication passage formed by a right angular positioned opening. Adjacent the second opening is a third opening generally parallel thereto and having an enlarged portion at one end, a central cylindrical portion and a threaded portion at the other. In this third opening is a valve spool having a frustoconical enlarged head positioned in the enlarged portion of the third opening and seating against the valve seat formed by the adjacent end of the central cylindrical portion. The spool has a neck which is positioned at about the point of the high pressure communication passage and at the other end of the spool is a cylindrical portion with a seal ring thereabout. The spool has an axial passageway extending the length thereof with a counterbore at the distal end of the cylindrical portion of the spool. The ball of the relief valve seats against this counterbore and is held in place by a spring. The part of the central portion of the third opening between the cylindrical head of the spool and the threaded portion of the third opening communicates with a drain opening to the reservoir. The high pressure communication passageway also connects to a third opening which contains a filter and has an external connection adapted to receive the fluid line to the cylinder. Communicating with the enlarged portion of the third opening is a passageway leading to a drain valve opening which has an enlarged upstream portion and a smaller downstream portion connected to a drain opening to the reservoir. A comparatively low pressure solenoid valve is threaded into the upstream portion of the drain valve opening and has valve elements extending into the downstream portion of the drain valve opening. When the valve elements are in one position flow from the upstream portion to the downstream portion is blocked, while when the valve elements are in a second position fluid flow at a controlled rate is permitted between the upstream portion and the downstream portion.

*Background of the invention*

This invention relates generally to constant volumetric flow-rate controls for hydraulic systems, and more particularly to a unitized control block assembly incorporating both pressure compensated flow control and a "bubble" type shut-off, the latter being so designed as to permit its control by means of a low capacity solenoid or the like.

The hydraulic controls used in many hydraulic lift systems are designed to inherently provide a constant drain rate from the hydraulic cylinders regardless of the load carried thereby. This ensures that a relatively heavy object on the lift platform will not drive the platform down at such a fast rate that the object thereon is injured, and more importantly, that such a forced fast rate of descent will not catch the lift operator off guard and physically injure him.

Since it is desirable that the controls provided with the hydraulic lift be of a simple nature, an electrical control circuit including a pair of push button switches is frequently used. One push button activates the pump motor when depressed to raise the lift, and the other activates a solenoid to open a drain line and permit the lift to lower. Inasmuch as push buttons can only give "on" or "off" control, fluid flow control which provides a constant drain rate independent of load, must be achieved internally. Herein this flow control is achieved by pressure compensation within the hydraulic system itself.

Beyond flow control, a hydraulic lift system also desirably incorporates a "bubble" type shut-off, this meaning that the drain line closure controlled by the operator's hand controls permits substantially no leakage which would otherwise allow the platform to settle under its own weight.

Although systems which perform in the above described way are well known, these systems are usually quite bulky and expensive, and they require a plurality of individual units to accomplish all of the foregoing desirable end results. Furthermore, while solenoids are frequently used to control lowering of the platform, these solenoids are usually used to open and close a valve against which the high pressure fluid is acting, thus requiring a large and expensive solenoid to overcome the large resistive force set up by the fluid pressure. These systems are therefore time consuming to service and expensive to maintain, and the entire lift is generally not usable while parts are being sought and repairs are being made.

It is a general object of this invention to provide an improved control assembly for controlling the flow of oil in a hydraulic system.

It is another general object and an advantage of this invention to provide a single envelope or unit assembly for controlling a hydraulic lift system, this envelope preferably including both pressure compensated flow control and a bubble type shut-off.

Another advantage of the present invention resides in the use of an exceptionally small and inexpensive solenoid for controlling the draining of fluid from the cylinder.

Still another advantage is derived from the ease and speed by which the entire control system can be replaced, thereby holding "down time" to a minimum.

An even further advantage of the present invention is the elimination of numerous fittings and hoses required in other systems.

Other objects and advantages of the invention will be apparent from the following description when taken in conjunction with the following drawings, wherein:

FIG. 2 is an enlarged vertical cross-section of the control block assembly shown in FIG. 1 taken substantially along the lines 2—2 of FIG. 1.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Figure 1:
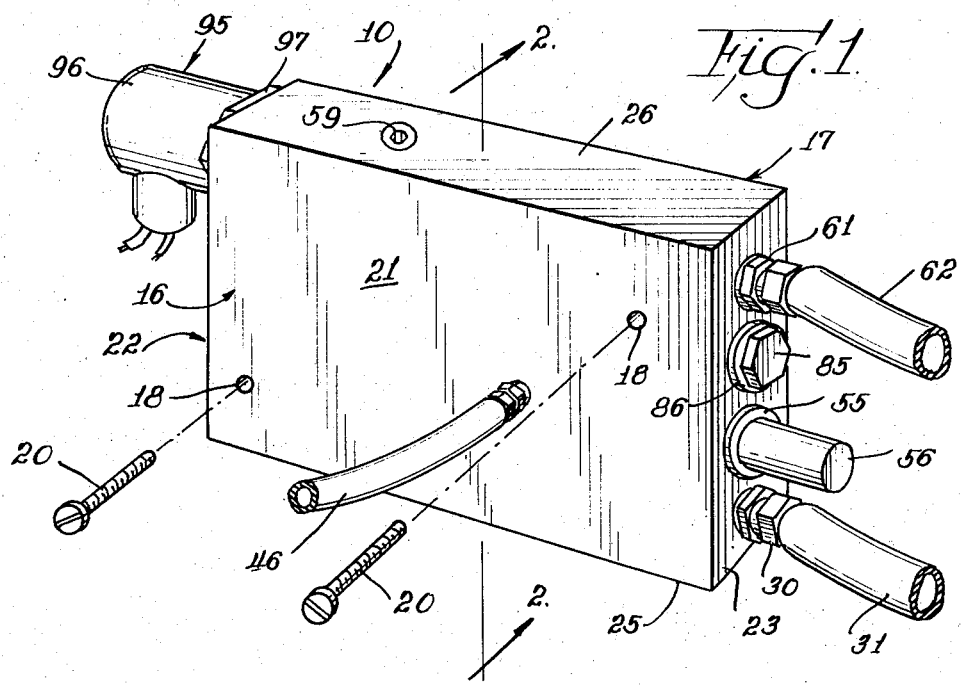
FIG. 1 is an outside perspective view of one preferred form of a control block assembly incorporating the principles of the present invention, and shows the front, top, and one side thereof.
Figure 3:
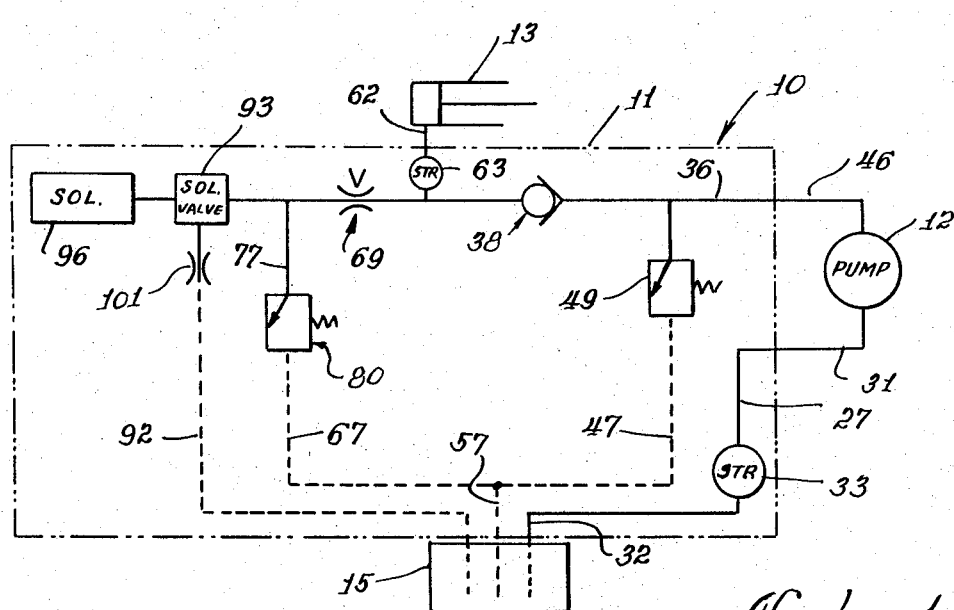
FIG. 3 is a schematic diagram of the entire hydraulic system used in the lift and distinguishes those portions of the hydraulic system encompassed by the control block assembly shown in FIGS. 1 and 2.

Referring now to the drawings in more detail, the hydraulic control unit or package is shown in the form of a control block assembly 10. As can be seen schematically in FIG. 3, block assembly 10 (shown in this figure within the component enclosure lines 11) is used to hydraulically control the movement of fluid within a hydraulic lift system which includes a pump 12, cylinder 13, and a fluid reservoir 15. Hydraulic cylinder 13 may be conventionally used to raise and lower a platform (not shown) or to perform any other desirable function. To provide power and simple operator's controls, a conventional electrical system is employed (not shown) which includes a first hand operated switch in the form of a push button which causes a motor to drive pump 12 and cause fluid to be pumped into cylinder 13 thereby raising the platform while the button is depressed, and another push button switch connected to control the main drain line which permits fluid to flow out of the cylinder 13 and back into reservoir 15 while it is depressed. Although the hydraulic controls to be described are shown used in conjunction with a hydraulic lift system, it will be understood that they have application in hydraulic systems appearing quite different from those shown and to be described. A brief comment on at least one other system will be presented later.

Referring now to the control block assembly 10 in more detail, the block assembly includes a main body portion or housing 16 consisting of numerous passageways defining passages therein. In the figures shown, housing 16 is fabricated from a rectangular block of material, preferably metal, and the passages are produced by machine tools. It will be understood that other methods of manufacture can produce such a housing, including those of casting and extruding.

Housing 16 has a flat rear wall or surface 17 to permit it to be mounted flush against a flat outer surface of the reservoir 15, preferably below the fluid level within the reservoir, and also contains two mounting holes 18 extending therethrough, each receiving a machine screw 20 for snugly securing the housing 16 to the reservoir body. Interposed between the housing 16 and the reservoir is a gasket (not shown) for preventing leakage between several aligned holes in the housing 16 and the reservoir. Housing 16 also has a front or front surface 21, side surfaces or edges shown at the left and right as 22 and 23 respectively, and a bottom edge and a top edge 25 and 26 respectively.

Extending horizontally into the housing 16 from the lower portions of its right side surface 23 is an elongate low pressure fluid passage 27 having threaded connection means 28 at its outermost end for permitting the end fitting 30 of a hydraulic line 31 to be attached thereto. Extending forwardly and approximately halfway into the housing from the lower portions of its rear surface 17 is a passage 32 which both intersects passage 27 and is aligned with a hole of similar diameter in the mounting wall of the reservoir 15 so as to permit free fluid flow from the reservoir into passage 32. Flexible line 31 continues to attachment with pump 12 so as to provide the pump with a source of fluid which it pumps into the cylinder 13 when the appropriate electrical control button is pushed. A strainer or filter 33 is provided in the passage 27 to ensure that foreign particle inclusions in the hydraulic fluid are not carried to the pump 12.

Immediately above passage 32 is an elongate check valve passage 35 extending approximately halfway into the housing 16 from its left side 22. Extending further inwardly from check valve passage 35 is a fluid inlet passage 36 of a lesser diameter than passage 35, thereby forming a shoulder at the innermost end 37 of passage 35. Shoulder 37 serves as the valve seat portion of a check valve shown generally at 38 and contained within passage 35, the other portions being a closure member 39 and closure biasing means in the form of a spring 40. Obviously, the valve seat could be in the form of an insert rather than shoulder 37. Fixed end 41 of the spring is mounted on an alignment member 42 which is screwed into threads provided therefor in the outermost end of passage 35 to perform the additional function of sealing the passage against fluid leakage.

Fluid inlet passage 36 includes means for attachment to a high pressure fluid source, and herein these means comprise an internally threaded transverse passage 45 communicating therewith. Transverse passage 45 extends from intersection with passage 36 to the front surface 21 of the housing 16 (its relative position shown by dot-dash lines in FIG. 2) and forms an inlet connection for a fluid inlet line 46. The other end of line 46 is connected to the output portion of the pump 12 which supplies the high pressure fluid.

In the event the pump motor might be overloaded, such as would occur if too large a load were placed on the lift platform, a high pressure relief valve is provided within the control block assembly to ensure that the motor is not injured. Extending horizontally into housing 16 from its right side 23 and in axial alignment with passages 35 and 36 is a high pressure relief valve passage 47. Passage 47 is of a greater diameter than passage 36 and connects therewith to form a shoulder 48 at its innermost end. Shoulder 48 serves as the valve seat portion of a high pressure relief valve shown generally at 49 and having its other components contained within the passage 47. These components consist of a closure 50 and closure biasing means in the form of a spring 51. Spring 51 is supported at its fixed end 52 by means of a combination spring preload adjusting screw and plug 53 screwed into the threaded outer end of passage 47. Portions of plug 53 project outwardly beyond right side surface 23 to provide exposed threads on which a sealing washer 55 and a cylindrical bolt 56 is mounted for sealing the outermost end of passage 47 against leakage. Relief valve passage 47 is in fluid communication with the reservoir by means of a transverse drain or drain passage 57 partially intersecting passage 47 at its upper and inner end. Drain passage 57 extends through rear surface 17 of housing 16 and is aligned with a comparably sized hole in the mounting wall of reservoir 15.

Extending downwardly into housing 16 from its top 26 and in fluid communication with the check valve passage 35 is an elongate high pressure intercommunication passage 58. The uppermost end of passage 58 is threaded to permit mounting therein of a pressure gauge, but it is herein shown sealed off with a threaded plug 59.

Extending inwardly from upper portions of sidewall 23 is an elongate and horizontal passage 60 which communicates with upper portions of passage 58 below the plug 59. The outermost end of passage 60 is threaded to receive the end fitting 61 of a high pressure line 62 extending between the housing 16 and the cylinder 13. Contained within passage 60 is a strainer or filter 63 which traps any foreign particle inclusions in the fluid. Passages 35, 58 and 60 may be thought of as a high pressure network within housing 16 inasmuch as fluid therein is always at substantially the same pressure as that in cylinder 13.

It can thus be seen that control block assembly 16 strains fluid drawn from the reservoir to the pump, and also strains the oil moving from the pump to the cylinder. Additionally, block 16 contains a check valve to prevent reverse flow of fluid from the cylinder back to the pump, and also contains a high pressure relief valve to prevent possible injury to the pump due to overload.

Assuming now that the lift is in some elevated position so that the hydraulic cylinder is at least partly filled with hydraulic fluid, the platform remains at this elevated position until the operator depresses the appropriate push button which electrically opens an appropriate drain line to permit the fluid to flow out of the cylinder and back into the reservoir. It will be observed that the fluid under pressure within the cylinder cannot force its way back into high pressure line 46 because of the check valve in passage 35 which prevents this reverse flow. The structure permitting a constant rate of fluid flow from the hydraulic cylinder 13 to the reservoir 15, independent of the load on the cylinder and thus independent of the fluid pressure within the high pressure network, will be described next.

Extending part way into housing 16 from its left side 22 is a horizontal regulator valve bore or passage 65 which is threaded at its outermost end to receive a threaded plug 66 which seals the passage 65 against leakage. Extending between passage 65 and right side surface 23, and in axial alignment with passage 65, is a regulator relief passage 67 having a lesser diameter than passage 65 so as to provide a shoulder 68 therebetween which serves as a valve seat for a pressure modulated regulator valve, generally 69, to be described shortly. Once again, the valve seat formed by shoulder 68 could take the form of an insert. Passage 67, which is situated between passages 47 and 60, intersects the vertically shown intercommunication passage 58 near its innermost end, and carries threads at its outermost portions. Passage 67 also partially intersects transverse drain passage 57.

Movably carried within passages 65 and 67, and forming a part of a regulator valve shown generally at 69, is an elongate spool type valve poppet 70 having a cylindrical guide portion 71 of a diameter slightly less than passage 67 to permit it to be carried therein and guided thereby. Portion 71 carries an O-ring seal 72 thereon to prevent high pressure fluid flow from passage 58 into passage 67 which would otherwise permit fluid to escape out of the high pressure network and allow the platform to settle under its own weight. Valve poppet 70 also includes a regulator valve closure portion 73 principally situated within regulator valve passage 65. The maximum diameter of closure portion 73 is somewhat less than the diameter of passage 65 to permit fluid flow therebetween. Closure portion 73 is defined in part by an end surface 74 and a tapered surface 75 which converges from end surface 74 toward guide portion 71 to permit its seating on the valve seat formed by shoulder 68. Connecting closure portion 73 and guide portion 71 is a cylindrical shaft 76 formed integrally therewith and of a substantially lesser diameter than passage 67. This permits fluid flow from the high pressure network into passage 65 when the valve 69 is open and an appropriate pressure differential exists.

A regulator relief valve is provided to permit a drainage of fluid out of regulator valve passage 65 when the pressure therein reaches some predetermined maximum level. Extending entirely through valve poppet 70 along its longitudinal axis is a hole 77. A counterbore 78 in the free end of cylindrical portions 71 forms a valve seat for a regulator relief valve, shown generally at 80, contained within regulator relief valve passage 67. Relief valve 80 also includes closure member 81 and closure member biasing means in the form of a spring 82. The fixed end 83 of spring 82 is adjustably positionable within passage 67 by means of an adjusting screw 84 which is screwed into the threaded end portions of passage 67. Adjusting screw 84 permits the proper preload to be applied to regulator relief valve spring 82. The outermost end of passage 67 is sealed by a sealing washer 86 compressed against right side surface 23 by means of a bolt 85 screwed into the outermost end of passage 67. It can thus be seen that if the pressure within passage 65 becomes too great, fluid can pass through hole 77 into passage 67 and can then pass into the reservoir 15 via transverse passage 57. It will be noted that spring 82 not only biases closure member 81 into contact with its valve seat as formed by counterbore 78, but also exerts a force on the valve poppet 70 tending to open regulator valve 69. Movement of valve poppet 70 under the bias of spring 82 is limited by stop means 87 contained within passage 65.

Extending into housing 16 from the upper portions of its left side surface 22 is a drain valve mounting passage 88 having a relatively large diameter, upstream, portion 89 extended coaxially by a smaller diameter, downstream, portion 90. Portion 89 is threaded at its outermost end, and its innermost end is in fluid communication with passage 65 by means of a transverse interconnecting passage 91. Smaller diameter portion 90 intersects a drain passage 92 extending between portions 90 and the rear surface 17 of housing 16 where it is aligned with a comparable diameter hole in the reservoir for permitting fluid drainage therein. Passages 88, 91, and 92 may be thought of as a main drain line for permitting controlled fluid flow out of the high pressure network.

Extending into portions 89 and partly into portions 90 of the drain valve mounting passage is a drain valve 93, shown herein as a portion of a solenoid and valve assembly 95 which also includes solenoid 96. The solenoid and valve assembly is a standard purchased item, however, as will be described in greater detail later, the arrangement of parts within the control block assembly permits an exceedingly inexpensive and light duty solenoid to be used.

Solenoid and valve assembly 95 is drawn up tight against the left side surface 22 of housing 16 by means of a threaded bolt 97 forming a part of assembly 95, and a seal 98 interposed therebetween prevents fluid leakage out of the housing 16. Drain valve portion 93 is of a conventional and commercially available construction having a fixed and calibrated restriction or orifice therein which permits a given volumetric flow rate therethrough for a relatively fixed pressure differential between portions 89 and 90 of the drain valve mounting passage 88. When the solenoid 96 is not energized, a needle valve (not shown) contained within solenoid valve 93 and controlled by solenoid 96 blocks the flow of fluid which would otherwise pass from passage portions 89 into passage portions 90. Flow between portions 88 and 90 along the outside of drain valve portion 93 is prevented by an O-ring seal 99. Therefore, when the solenoid is not energized, fluid cannot drain out of the high pressure network via passage 65 unless the system is overloaded. On the other hand, when the operator depresses the appropriate electrical control button, solenoid 96 is activated and exposes the calibrated orifice within the drain valve.

Fluid under pressure in portions 89 of passage 88 is then free to flow into holes 100 in the solenoid valve, and from there into portions 90 of the passage 88 by way of an end hole 101 also in the solenoid valve. The fluid then drains into the reservoir via drain passage 92. As will be described in greater detail later, the fluid in passage 65 is of a lesser pressure than the fluid in the high pressure network during draining of cylinder 13.

Installation of the control block assembly 10 into the hydraulic lift system is both simple and fast. Housing 16 is screwed snugly against an outer flat wall of reservoir 15 by means of screws 20 after a gasket is first interposed therebetween. This gasket has appropriately placed holes therein to permit fluid communication between passages 32, 54 and 92 and aligned holes in the reservoir. The solenoid electrical leads are attached into the electrical system, and the end fittings of the three fluid lines 31, 46 and 62 are screwed into their appropriate passage connections. The reservoir can then be filled with hydraulic fluid, and the electrical system is connected to a source of electrical power. This is all that is necessary to install the hydraulic controls, and, of course, twice this effort is all that is necessary to change a control unit in the event of a failure. It can thus be seen that "down time" for the entire hydraulic lift is held to a minimum.

In order to raise the platform, the operator merely depresses the motor controlling push button to start the motor and begin pumping hydraulic fluid by means of pump 12 through the high pressure line 46. The pump is constantly replenished with hydraulic fluid which passes from reservoir 15 through transverse passage 32, through low pressure fluid passages 27 where it is strained by means of strainer 33, and through hydraulic line 31 which leads to the pump. High pressure fluid traveling in line 46 enters the control block assembly via transverse passage 45 and travels then to the cylinder 13 by way of passage 36, passage 35 (after unseating check valve 38), passage 58, passage 60 (where it is strained by means of strainer 63), and then through high pressure line 62. When the platform reaches the desired height, the operator merely removes his finger from the motor controlling push button which stops the motor and fixes the height of the platform. Inasmuch as the solenoid 96 is not activated, and because check valve 38 is now seated, the platform remains at the desired level. In the event the pumping load on the motor is too great during lifting of the platform, the pressure of the fluid in passage 36 will overcome the preload in spring 51, thereby opening relief valve 49 and permitting the hydraulic fluid to escape back into the reservoir via passages 47 and 57.

It will be remembered that spring 82 exerts a force on the valve poppet 70 in a manner tending to open regulator valve 69. After the platform or end surface 74 is bottomed against stop 87, no differential pressure exists between passages 58 and 65; and therefore, valve 69 is open. Upon activating the motor controlling push button, some of the fluid pressure built up in passage 58 is transferred into passage 65 and increases the fluid pressure therein. When the pressure in passage 65 reaches some predetermined value, the force it exerts against end surface 74 of valve poppet 70 overcomes the oppositely directed force created by spring 82, and the valve 69 closes preventing further pressure transfer into passage 65. Thus, a pressure differential will normally exist between passage 65 and the high pressure network. As an example of one specific application of the control block assembly, regulator valve 69 is designed to close when the pressure in passage 65 exceeds 100 p.s.i., this pressure being sufficient to overcome the preload in spring 82. Varying the preload in spring 82, of course, will vary the pressure necessary in passage 65 to close the regulator valve. It will be noted that the fluid in the high pressure network exerts opposing horizontal forces directed outwardly against tapered surface 75 and guide portion 71 of valve poppet 70, and these forces entirely balance one another because these portions expose identical maximum and minimum diameters to the high pressure fluid. Therefore, the pressure within passage 65 remains constant at this 100 p.s.i. value regardless of the pressure in the high pressure network 35, 58, 60. Fluid within passage 65 cannot escape to the reservoir via the main drain line, of course, because the solenoid operation drain valve 93 is closed. Inasmuch as solenoid 96 never acts against the relatively high pressures which may be built up within the high pressure network, this solenoid is of a low cost and light duty construction.

In lowering the platform, the operator depresses the solenoid activating push button which activates the solenoid and opens the drain valve 93, thus exposing the calibrated orifice in the drain valve. The pressure in passage 65 is thus diminished, causing spring 82 to open regulator valve 69 and permit high pressure fluid to flow from passage 58 into passage 65, through passage 91, through the orifice in the drain valve 93, and back into the reservoir 15 by way of drain line 92. Since the calibrated orifice restricts fluid flow therethrough, a back pressure is set up which is reflected in passage 65. In the specific application described above, an orifice of 1/8-inch diameter is used and creates a back pressure of 100 p.s.i. at a flow rate of 2 gallons per minute. This back pressure exerts a force on the valve poppet surface 74 tending to close the regulator valve 69. On the other hand, spring 82 exerts an opposing force tending to open it. Too large a flow through valve 69 increases the back pressure which tends to close valve 69, and too small a flow decreases the back pressure which tends to open it. The net effect is to create a pressure compensated system which adjusts valve 69 to the proper opening such that the fluid pressure within passage 65 is maintained at a predetermined constant independent of the load on cylinder 13. In the example described, this pressure is 100 p.s.i. Inasmuch as the pressure within passage 65 is constant regardless of load, the flow of hydraulic fluid through the calibrated orifice in the drain valve 93 is also a constant regardless of load. It can thus be seen that the control block assembly 10 achieves constant flow drainage.

If different rates of flow are desired other than that afforded by the fixed orifice, a manually adjustable needle valve could be added at some convenient location, such as in the drain passage 92, to provide a variable drain rate.

In the event that regulator valve 69 becomes damaged or worn, or if a foreign particle prevents the valve to properly seat, the pressure in passage 65 might increase beyond the maximum for which it is set. Because this pressure might be injurious to the solenoid 96, the regulator relief valve 80 is designed to relieve it before it reaches damaging proportions. In the example cited, relief valve 80 will open at about 300 p.s.i. Since the pressure in hole 77 is equal to the pressure in passage 65, this pressure unseats closure 81 of the regulator relief valve and permits the fluid to escape into the reservoir via passage 67 and drain passage 57. Thus, a damaging pressure is never built up in passage 65 inasmuch as it is permitted to drain off before it reaches damaging proportions.

It is thus seen that this single package in the form of control block assembly 10 combines a pressure compensated flow control system with a "bubble" type shutoff controlled by a low-cost solenoid. This envelope is not only inexpensive and compact in itself, but also eliminates the necessity of numerous other expensive and bulky parts used in other systems.

The invention herein disclosed is not to be construed as confined to hydraulic lift systems, nor even to constant flow systems. The principles herein disclosed may have application in systems appearing quite different from the one described. For example, it has been noted that the pressure within passage 65 is a constant regardless of the variation of pressure within the high pressure network. Therefore, any system requiring a constant pressure source could make use of this disclosure by tapping pressure from this passage.

We claim:

1. A unitary control block assembly for controlling fluid flow in a hydraulic system including a reservoir holding the hydraulic fluid and with communication openings therein, a pump having a high pressure side and a low pressure side and a hydraulic cylinder, said assembly comprising:

a main body block having a rear face and two elongated edges, and two other edges connecting said elongated edges a first opening extending between said elongated edges, the external portions of said first opening being larger in diameter than the central portion to define valve seats at each end of the central portion, one of said enlarged portions defining a high pressure relief passage, the other of the enlarged portions forming a check valve passage a pump output passage communicating with said central portion with an external line connection for said output passage to permit the high pressure side of the pump to be connected thereto a second opening extending between said elongated edges with an enlarged end portion at one elongated edge, a connecting smaller diameter portion defining a valve seat at the juncture of the two portions, and a threaded portion at the opposite elongated edge a drain valve opening extending inwardly from one of the edges with an upstream portion and a downstream portion, the upstream portion communicating with the enlarged end portion of the second opening a pump intake passage with an external line connection for the pump intake passage to permit the low pressure side of the pump to be connected thereto a cylinder passage with an external line connection for the cylinder passage to permit the cylinder to be connected thereto a high pressure communication passage communicating with the smaller diameter portion of the second opening intermediate the ends of said portion, with the check valve passage and with the cylinder passage, and reservoir openings extending through the rear face in line with the communication openings in the reservoir, said reservoir openings communicating with the high pressure relief passage, the pump intake passage, the smaller portion of the second opening, and the downstream portion of the drain valve opening;

a check valve in said check valve passage including a closure seated on said valve seat in the check valve passage and a spring urging said closure against said seat;

a first high pressure relief valve in said high pressure relief passage including a closure seated on said valve seat in the relief passage and a spring urging said closure against said seat;

a valve spool including an enlarged frusto-conical head at one end, a cylindrical head at the other end and a neck of smaller cross-section therebetween, said cylindrical head having a sealing ring thereabout, an axial passageway extending the length of the spool with a counterbore on the distal end of the cylindrical head in communication with the axial passage, said spool being positioned in the second opening with the enlarged head seated on the valve seat in the second opening and forming a closure, said neck being in that area of the second opening which is in communication with the high pressure communication passage and the cylindrical head in that part of the second portion of the second opening adjacent the threaded portion with the sealing ring fitting against the walls of the second opening;

a second pressure relief valve in that part of the second portion of the second opening between the cylindrical head and the threaded portion and including a closure seated on the spool at said counterbore and a spring urging said closure against said spool;

a comparatively low pressure solenoid valve secured to said body block and having valve elements in the drain valve opening which elements block communication between the upstream and downstream portions when the valve elements are in a first position and allow flow at a controlled rate between the upstream and downstream portions when the valve elements are in a second position to control the fluid pressure in the enlarged end portion of the second opening and thus the position of the valve spool and the flow from the high pressure communication passage to the downstream portion and the reservoir opening communicating therewith; and removable closure means for the edge ends of the first and second opening;

whereby said body block may be removable affixed to the reservoir to provide the major part of the components and connections for said system in a package which may be conveniently removed for replacement and for servicing.

2. An assembly as set forth in claim 1, wherein, said first and second openings are substantially parallel, said pump intake passage and said cylinder passage are elongated openings substantially parallel to the first and second openings, said closures of the check valve and the first and second relief valves are balls, and including filter means in the pump intake passage removable through the external line connection thereof, filter means in the cylinder passage removable through the external line connection thereof, and a stop in the enlarged portion of the second opening and affixed to the removable closure means at the edge end of the enlarged portion of the second opening.

References Cited
UNITED STATES PATENTS

| | | | |
|---|---|---|---|
| 2,495,785 | 1/1950 | Stephens | 91—443 |
| 2,501,483 | 3/1950 | Taylor | 91—443 |
| 2,687,743 | 8/1954 | Huber | 137—116.5 |
| 3,113,432 | 12/1963 | Watson | 91—446 |

MARTIN P. SCHWADRON, *Primary Examiner.*

B. L. ADAMS, *Assistant Examiner.*